United States Patent [19]
Boffelli

[11] 4,335,633
[45] Jun. 22, 1982

[54] TAILSTOCK FOR MACHINE TOOLS, IN PARTICULAR LATHES OR THE LIKE WITH ELECTRIC ACTUATOR HAVING A MONITORED THRUST

[75] Inventor: Pier C. Boffelli, San Donato Milanese, Italy

[73] Assignee: Baruffaldi Frizioni S.p.A., Milan, Italy

[21] Appl. No.: 191,025

[22] Filed: Sep. 26, 1980

[30] Foreign Application Priority Data

Sep. 28, 1979 [IT] Italy .................... 26101 A/79

[51] Int. Cl.$^3$ ............................................. B23B 23/00
[52] U.S. Cl. ................................... 82/31; 51/237 R
[58] Field of Search ............... 82/31, 33 R; 51/237 R

[56] References Cited

U.S. PATENT DOCUMENTS

| | | | |
|---|---|---|---|
| 2,247,562 | 7/1941 | Santen | 82/31 |
| 3,198,042 | 8/1965 | Binns | 82/31 |
| 3,519,096 | 7/1970 | Lunzer | 82/31 |
| 3,731,564 | 5/1973 | Diener et al. | 82/31 |
| 4,033,210 | 7/1977 | Swenson | 82/31 |

*Primary Examiner*—Leonidas Vlachos
*Attorney, Agent, or Firm*—Karl F. Ross

[57] ABSTRACT

An electrically actuated tailstock for machine tools, program-controllable both manually and automatically, the movements of which are effected in sequence, producing initially a rapid approach, then a slow thrust movement until the pre-determined pressure load is achieved and, finally, the stopping of the movement with the simultaneous actuation of an electro-magnetic brake for the maintenance of the pressure load during the entire period of operation. The return movement is rapid and can be limited. The thrust load on the axis of the tailstock center is transmitted by resilient means, and is made visible to the operator in the desired value.

8 Claims, 3 Drawing Figures

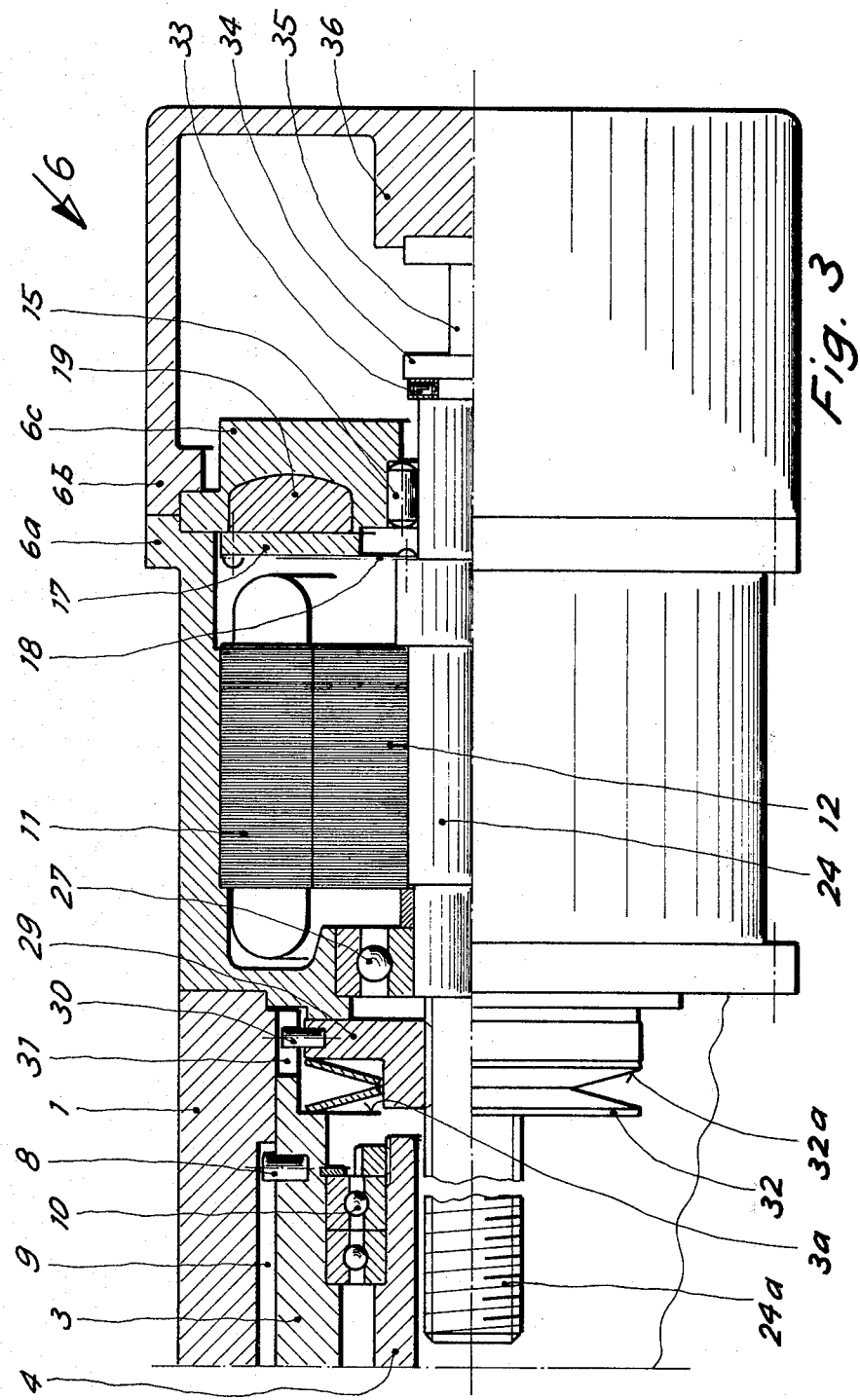

TAILSTOCK FOR MACHINE TOOLS, IN PARTICULAR LATHES OR THE LIKE WITH ELECTRIC ACTUATOR HAVING A MONITORED THRUST

The present invention concerns a tailstock for machine tools, in particular for lathes or the like machines, in which the axial approach and pressure movement of the centre on the part is effected by an electric actuator incorporated in the support of the centre itself by which there is obtained, by manual control or automatically, a rapid approach movement and a slow pressure movement, the axial thrust of the centre on the part being predetermined and monitored during the operation in order to eliminate any possibility of excessive or insufficient pressure with harmful consequences to the making of the part being prepared, said operation being made visible externally.

As is well known, the tailstock of a lathe, or the like machine tool, has the object either of supporting the part being prepared relative to the part opposed to that engaged by the chuck or of guiding the part itself during rotation and under the cutting action of the tool so as to keep the axis of rotation of the part exactly coincidental with the axis of the lathe specified by the chuck and tailstock. For this purpose the tailstock, conditioned to permitting the support of the part by its own centring hole on the end of the tailstock itself, must also thrust axially its own end into the centring hole with a certain load in order to achieve stable contact between the opposing surfaces without creating deformations or movements of the part itself. For these reasons, as is well known, after the tailstock has been brought close to the centring hole, the operator proceeds sensitively to establish the axial thrust with which the tailstock centre is placed against the part being prepared. Furthermore, the operations of approach and pressure, if carried out manually, require time and particular attention on the part of the operator and if performed with the assistance of electric motors, they are difficult to monitor, with consequential serious disadvantages.

The tailstock having an electrical actuator in accordance with the invention, apart from eliminating said disadvantages, makes it possible to pre-determine the axial thrust against the part and to monitor it visually during the preparation thereof with the possibility of intervention and also automatic adjustment.

According to the present invention the tailstock comprises a supporting case connectable to the bed of the machine and within which case a pipe or tubular member is axially displaceable and on the end of which member the actual tailstock centre is mounted so that it can rotate about the axis of the tubular member itself also under the axial pressure exerted on the part itself.

Provided within the case is an electric motor, the stator of which is connected to the said case, whilst the rotor is mounted on a rotatable further tubular member co-axial with the axis of the centre and supported on the case by means of bearings or the like. The further rotatable member has a serration and in one arrangement forms the driving wheel of an epicyclic reduction gear, the planets of which are carried by a co-axial support and engaged with an end wheel connected to the said stationary case. The said support is connected to and for rotation on a central shaft which extends at one end within the said rotatable further member and at the other end extends towards the centre, the latter end being threaded over its entire length. The said support with associated shaft is also supported on bearings on said case which comprises said members. Said central shaft is associated at the threaded end with a nut or threaded member which is axially displaceable, but secured to rotate and, at the other end, has a member for receiving the load or load container, disposed axially and driven by the rotatable shaft by way of a thrust-controlling bearing or the like. The said nut transmits its own axial movement to an external tubular member on which the centre is mounted to rotate, but is axially displaceable, the said drive transmission being effected by way of interposed resilient members such as cup springs or the like.

According to the invention, with the movement of the rotor, the rotatable member, by way of the epicyclic reduction gear, rotates the central shaft, thus in turn axially displacing the nut, and hence the latter, by way of said resilient means, gives an axial thrust to said centre carrying member. The reaction of the part being prepared to the thrust of the centre is absorbed by the interposed resilient means and is transmitted to the central shaft which in turn transmits it to a load cell for receiving pressure and the thrust is indicated externally by suitable means.

According to the invention, the assembly is completed by an electro-magnetic brake which in turn is connected to rotate with the rotatable member by way of thin resilient plates and said brake, normally engaged, is disengaged when the rotor has to rotate for the approach and pressure movements of the centre.

According to the invention, it is also proposed that the electric motor should be provided with two windings of different polarity in order to obtain greater speed in the approach and return phase, whilst the lesser speed is used for the pressure phase.

In an alternative arrangement the said electrically operable tailstock may be provided without an epicyclic reduction gear in cases where the electric motor is calculated to produce a sufficient couple to create, by means of said central shaft with screw and associated nut, on the centre the thrust load required for holding the part which is being prepared. The said central shaft is likewise in contact, by the end opposed to that of the screw, with the load cell for detecting the pressure exerted by the centre, as already described.

In summary and in accordance with the broad aspect of the present invention there is provided a tailstock for machine tools in particular for electrically operated lathes or the like machine tools, comprising a two-speed electric motor having a stator which is connected to a normally stationary supporting case connectable to the bed of the machine, and a rotor which is connected to a rotatable tubular member co-axial with the axis of the tailstock centre: the rotor being either indirectly connected to a central shaft via an epicyclic reduction gear, the carrier of which gear is co-axially rotatable with the centre and connected to the central shaft, or said rotor being directly connected with the said central shaft in cases where sufficient couple developed by the electric motor; said central shaft being provided at its forward end with a thread and at its rear end with a load detector, axial movement being transmitted to the centre by threaded means and resilient compression means, the axial load achieved being sensed or detected by said load detector whose output is transmitted to a visible numeric display and/or control means operable so as to limit it to a pre-determined value by electrical comparison means, and an electro-magnetic locking brake being provided for the maintenance of the axial load reached by the centre.

The invention will be described further, by way of example, with reference to the accompanying drawings, which illustrate an electric actuator for a tailstock of a lathe or the like machine and in which:

FIG. 3 is a section corresponding to that in FIG. 2 but through a modified embodiment without reduction gear.

Figure 1:
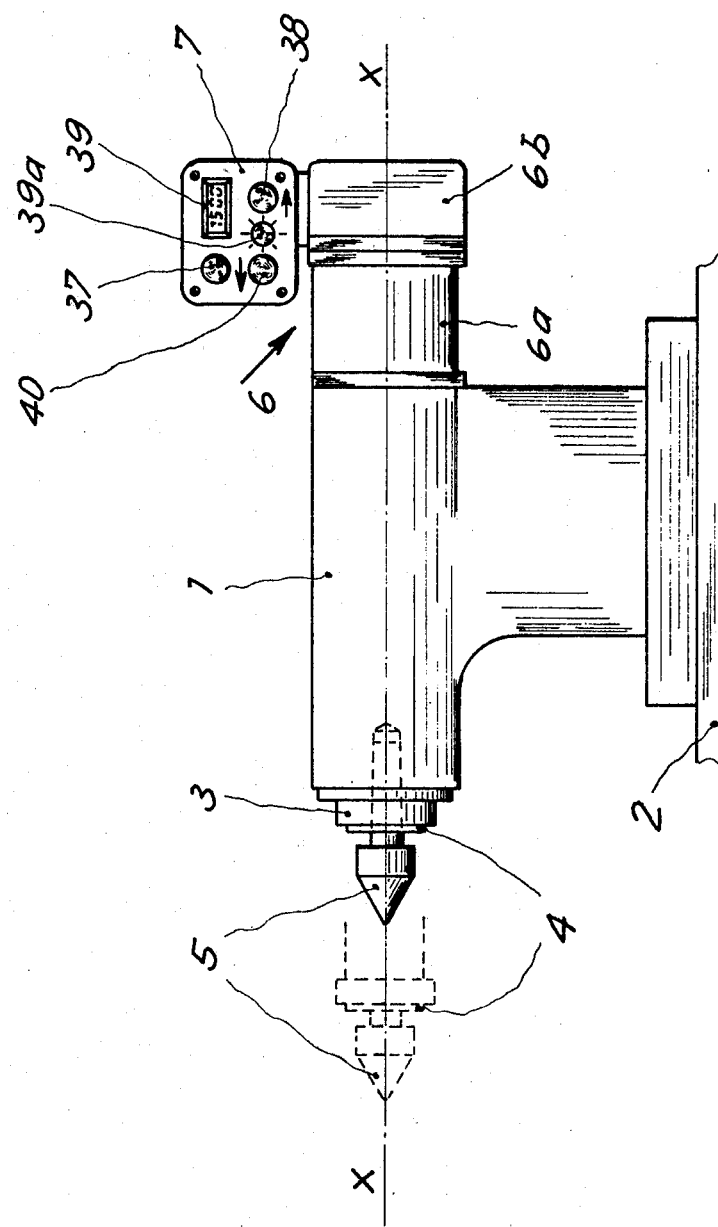
FIG. 1 is an external schematic elevation of the entire tailstock with an electric actuator incorporated.

Referring to FIG. 1 an entire tailstock is shown formed by a base 1 axially displaceable on the bench or bed 2 of a machine tool and carrying at the working end a secured external pipe or tubular member 3 which is axially displaceable and within which a sleeve 4 is mounted to rotate on bearings and carries a tailstock centre 5 or the like. The member 3 can slide axially over a relatively long path until it brings the centre 5 to the part to be worked and thereupon the centre 5 is inserted in a centring hole of the part and is pressed thereon with a load sufficient to ensure the co-axial positioning of the above-mentioned part which is being prepared, with the axis X—X of the centre lying in the axis of the machine tool. Secured to said base 1 is a fixed case 6 containing an electrical actuating device for the centre and on the outside of which device a panel 7 is mounted having controls associated with the desired movements—as will be specified hereinafter.

Figure 2:
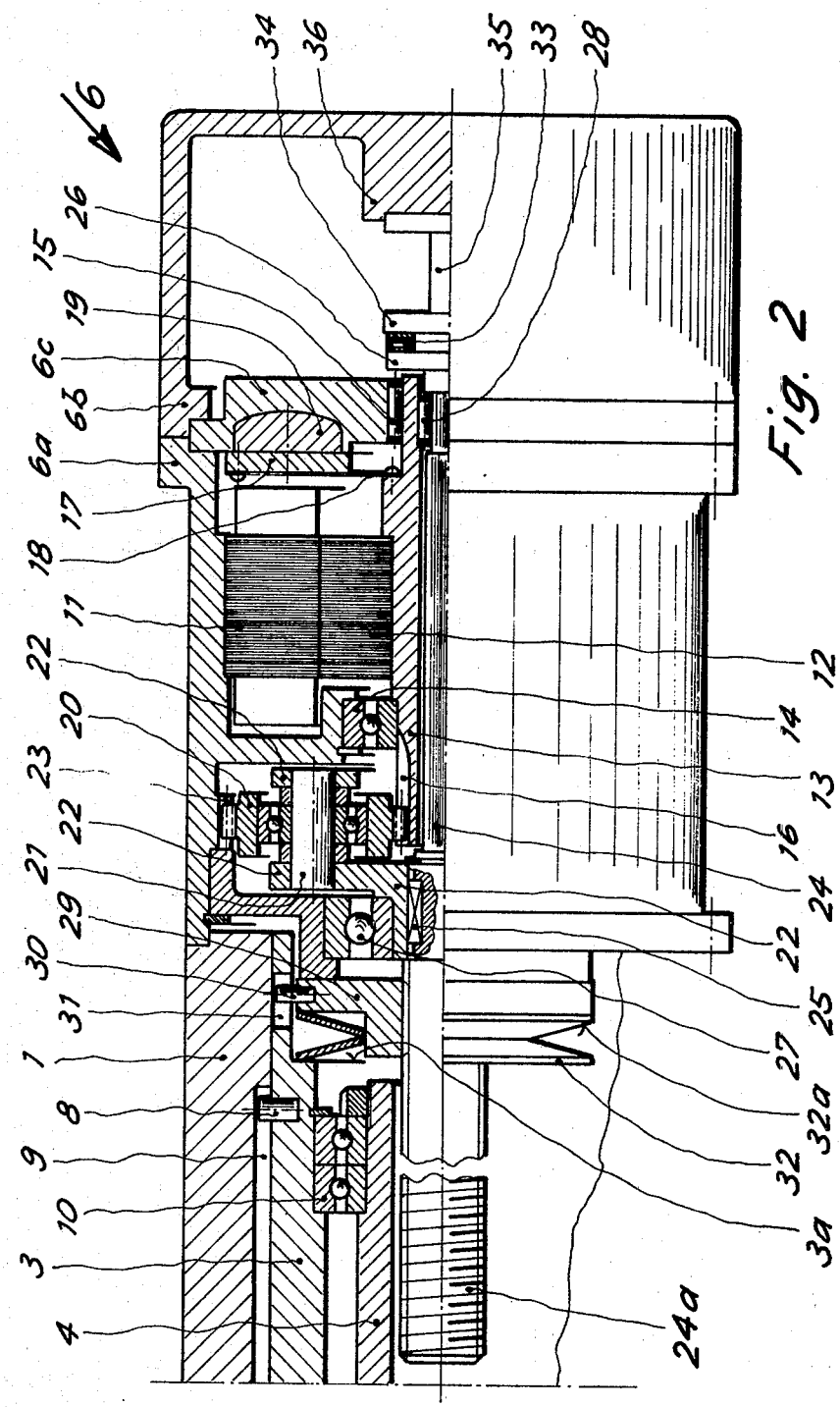
FIG. 2 is a part section through the electric actuator on an axial plane.

FIG. 2 shows the upper part of the base 1 and the rear part of the external tubular member 3 axially displaceable within the base 1, guided by a pin 8 sliding within a channel 9 of the base 1 and carrying within it the sleeve 4 which is rotatable on bearings 10 within the chamber 3, but connected axially thereto. A stationary tubular member 6a of the case 6, including the electrical actuating device, is secured to the base 1 and within which there is firmly disposed a stator 11 of an electric motor with two windings having a different number of poles, for example with two poles and four poles, whilst the rotor part 12 of the motor is connected to a pipe or tubular member 13 rotatable in the secured stationary case 6a by means of the bearings 14, 15 and carrying at the front end, a serrated part 16 facing outward of the tailstock. The said rotatable member 13 is provided at the rear end with an electro-magnetic brake formed by a ring armature 17 connected to the member by means of thin resilient plates 18 and constantly attracted by the stationary permanent magnet 19 inserted in an intermediate disc 6c connected to the case 6a; the magnetic action of which can be neutralised and therefore the armature 17 freed, by means of an electric winding (not shown) for producing, as desired, a magnetic flux contrary to that of the permanent magnet 19. The serrated part 16 of the rotatable member 13 engages with planets 20 supported by means of a pivot 21 and by a support 22 co-axially rotatable with the member 13 and meshing in their turn with a toothed crown 23 connected to the stationary case 6a and constituting the end wheel of an epicyclic reduction gear comprising the said members and the driving wheel of which is formed by the said teeth 16 connected to rotate with the rotor 12 of the electric motor. The support 22 is connected to a central shaft 24 by means of a cotter 25 or the like, said shaft extending backwardly within the member 13 by a cylindrical part terminating in a disc 26 and forwardly, i.e. towards the centre 5 (FIG. 1) with a threaded pivot 24a. The entire assembly, constituted by the central shaft 24 with support 22 connected thereto, and resting on the bearings 27 relative to the stationary case 6a and 28 relative to the rotatable member 13, in turn supported by the bearing 15 relative to the case 6a. Disposed on said threaded pivot 24a is a nut 29 capable of axial displacement, but not rotation, being locked in this direction by the pin 30 guided within the window 31 formed on the outer member 3, in turn not rotatable on account of the pin 8 displaceable within the fixed channel 9. The nut 29 in turn carries a resilient transmission means of the axial drive to the sleeve carrying the centre and formed, in the embodiment shown, by two cup springs or the like 32, 32a which are supported against a shoulder 3a of the outer member 3. On the opposite side, the shaft 24 ends with the said disc 26 which, by means of a controlling thrust bearing 33 transmits the axial thrust to another disc 34 which in turn bears on a load detecting means such as a load cell 35, for example, and for electrical resistance members or the like, in turn bearing on a support 36 connected to the rear part 6b of the fixed case 6. Provided on the control panel 7 (FIG. 1), associated with the case 6, is a push button 37 for starting the motor in the forward direction, a push button 38 for operating in the opposite direction, a digital indicating volt meter or the like 39 with knob 39a for control, and push button 40, if desired, for slow forward movement under manual control.

Operation, from the position with tailstock centre retracted, as shown in the Figures, is as follows:

The operator depresses the push button 37 to disengage the electro-magnetic brake 17, neutralising the magnet 19, and energises the electric motor in the winding having a fewer number of poles and hence rotates the rotor with the greater speed. The rotor sets in rotation the rotatable member 13 which, via the teeth 16, rotates the planets 20 which in turn, bearing on the end wheel 23, rotate the support 22 with a speed proportional to the reduction ratio provided by the assembly forming the epicyclic reduction gear.

The support 22, being connected to the central shaft 24, rotates said shaft, whereby the threaded part 24a axially advances the nut 29, the pin 30 of which slides in the window 31. With such movement the springs 32, 32a in contact with the outer member 3, thrust said member in an axial direction without exerting an appreciable load, the centre being in the phase of rapid approach to the part to be operated on mounted on the self-centring means or the like of the lathe. A suitable contact at the end of the movement (not shown) previously set in a suitable position by the operator, proceeds at the end of the rapid approach movement to break-off in known manner the feed to the first winding of the electric motor and to start that of the winding having the greater number of poles, whereby the rotor continues to rotate, but at a lower speed. The centre 5, mounted on the sleeve 4, comes into contact with the part (not shown) whereby the outer member 3 is no longer able to advance and as a result of the opposing action derived therefrom, the cup springs 32, 32a begin to flex themselves producing an axial load by which the centre 5 is thrust against the part. The reaction of the said springs is exerted on the shaft 24 and, by means of the bearing 33, on the load cell 35 of the load located co-axially with the shaft 24 itself. As is well known, it is possible to detect the output voltage of the load cell 35, which is proportional to the load itself, to amplify it and indicate it on a numeric panel 39 within sight of the operator, in a ratio which corresponds, for example, for each unit of the visible index, to a Kg axial load on the centre.

According to the present invention, and in combination with what has been described, it is proposed to complete the electrical control circuit with known means by which the signal emitted by the load cell is simultaneously compared with an electrical reference signal, the amount of which is pre-determined in advance by means of a knob, for example 39a, of a known voltage comparator (not shown). When the signal emitted by the load cell is greater than the pre-determined reference signal, suitable known electric circuits (not shown) initially operate the electro-magnetic brake and then cut off the voltage to the motor, thus stopping the entire device in the position reached and with the desired axial thrust.

The return movement is effected by releasing the electro magnetic brake and reversing the rotation of the motor by pressing the push button 38 having energised it in the winding which determines the greater speed. The rotation of the motor in a direction opposed to the foregoing causes the nut 29 to withdraw and initially relieves the springs 32, 32a from the axial pressure and then, by means of the pin 30, when the latter has reached the end of the window 31, trails behind the sleeve 3 until the desired withdrawn position which may also be stabilised, for example, by means of a suitable end stop (not shown) positionable by the operator. It is also possible to actuate the electric motor at a low speed by means of a suitable push button 40 in cases where it is sufficient to effect limited movements whereby a rapid advance movement is not necessary.

FIG. 3 shows a modified embodiment of a tailstock similar to that as already described, wherein the epicyclic reduction gear is eliminated for cases where the electric motor is calculated to produce a sufficient couple to create, by means of the said central shaft with screw 24a and the nut 29, a thrust load transmitted to the centre of sufficient value required for the machining of the part.

In FIG. 3, in which the same reference numerals of FIGS. 1 and 2 are used for the same parts, it will be seen that the central shaft 24 is directly connected for rotation with the rotor 12 of the electric motor. Whilst the central shaft 24 is connected for rotation with the rotor 12, it is also able to execute small axial movements towards the load cell 35, against which, as in the preceding case, shaft 24 bears by way of the thrust control bearing 33. The operation is similar to that described with reference to FIG. 2, except that when the rotor 12 is set in rotation, the shaft 24 also rotates displacing the nut 29 axially by means of the threaded portion 24a, which nut 29 in turn advances or retreats according to the direction of rotation of the shaft 24 acting against the springs 32, 32a as already described.

By means of the tailstock with electrical actuator, according to the invention, described above in the forms of actuation with epicyclic reduction gear and without a reduction gear, it is possible to avoid a serious disadvantage which may occur in cases where the entire tailstock is not sufficiently locked on the bench or bed of the machine tool or if the locking is reduced accidentally. In these cases the reaction of the thrust exerted by the centre and absorbed by the locking thereof on the bench or bed, may be such as to cause the entire tailstock to retreat, even by a minimum amount, thus reducing the load retaining the part. In these cases it might happen that during the operation the part subjected to the cutting load is flung out of the machine with serious consequence. This disadvantage is avoided if, in the electric control circuit, the said voltage comparator device, which during the advance of the centre compares the thrust load on the centre, by way of the signal emitted from the load cell with the pre-determined electrical reference signal, detects the possible reduction in the thrust load exerted by the centre whereupon the motor is stopped. This realisation may be translated by known electrical means for the stopping of the entire machine and/or in the signalling of the accidental slipping of the centre or tailstock.

It is understood that numerous variants in the type of construction adaptable to the necessities of tailstock centres applied to various machine tools may be made to what has been described above without thereby departing from the scope of the present invention as defined in the appendant claims.

I claim:

1. A tailstock for machine tools in particular for electrically operated lathes or the like machine tools, comprising a normally stationary supporting casing connectable to the bed of a said machine, a two-speed electric motor having a stator which is connected to said casing and having a rotor which is connected to a rotatable tubular member co-axial with the axis of the tailstock centre: said rotor being indirectly connected to a central shaft via an epicyclic reduction gear, the carrier of which gear is co-axially rotatable with the centre and connected to the central shaft, said central shaft being provided at its forward end adjacent said centre with a thread and at its rear end remote from said centre with a load detector, axial movement of the centre being effected by threaded means and resilient compression means between said shaft and said centre, the axial load existing being sensed or detected by said load detector whose output is transmitted to a visible numeric display and control means operable so as to limit it to a predetermined value by electrical comparison means, and an electro-magnetic locking brake being provided for the maintenance of the axial load reached by the centre.

2. A tailstock according to claim 1, wherein said epicyclic reduction gear is driven by a toothed portion of a rotatable member connected to the rotor of said electric motor and the outer wheel of said gear is connected to said casing, said carrier being supported on the stationary part also by means of the said central shaft.

3. A tailstock for machine tools in particular for electrically operated lathes or the like machine tools, comprising a normally stationary supporting casing connectable to the bed of a said machine, a two-speed electric motor having a stator which is connected to said casing and having a rotor which is connected to a rotatable tubular member, co-axial with the axis of the tailstock centre: the rotor being directly connected with a central shaft—sufficient couple being developed by the electric motor; said central shaft being provided at its forward end adjacent said centre with a thread and at its rear end remote from said centre with a load detector, axial movement of the centre being effected by threaded means and resilient compression means between the shaft and centre, the axial load existing being sensed or detected by said load detector whose output is transmitted to control means operable so as to limit it to a pre-determined value by electrical comparison means, and an electro-magnetic locking brake being provided for the maintenance of the axial load reached by the centre.

4. A tailstock according to claim 1 or 3, in which the said threaded means associated with the central shaft transmits the axial movement of rapid approach and slow pressure by means of the compression of said co-axial resilient means, whilst the return movement is effected by direct contact with the outer tubular member.

5. A tailstock according to claim 1 or 3, in which the said electro-magnetic brake connects the said rotatable member to the rotor of the motor with secured member (part) by means of a permanent electro-magnet, the release of the brake being effected at the start of each phase of advance or withdrawal of the centre point.

6. A tailstock according to claim 3, wherein the rotor of the electric motor is firmly connected without interposition of said epicyclic reduction gear part to rotate with said central shaft carrying the advancing screw for the centre and on which the said threaded means is displaceable; the axial reduction in thrust on the centre also being detected by means of the said central shaft freely axially displaceable towards the load detector.

7. A tailstock according to claim 1 or 3, wherein said axial load detected or sensed is compared with a pre-determined signal which represents the axial load limit which it is desired to achieve such that the thrust on the centre is stopped when the effective load is greater than that of a pre-determined comparison load.

8. A tailstock according to claim 1 or 7, in which the control means are such that the sensing of the axial load exerted by the centre against the part being prepared is effected even after the stopping of the electric motor thereof and compared with the said pre-determined signal of the axial load limit so that if the effective load, after having achieved said limit, reduces in value for accidental reasons or the withdrawal of the tailstock centre, the control is provided with known electrical means for the stopping of the entire machine and/or signalling of the disadvantageous situation.

* * * * *